(12) United States Patent
Irie

(10) Patent No.: US 7,880,783 B2
(45) Date of Patent: Feb. 1, 2011

(54) IMAGE PICKUP APPARATUS AND METHOD

(75) Inventor: Kousuke Irie, Kurokawa-gun (JP)

(73) Assignee: Fujifilm Corporation, Tokyo (JP)

( * ) Notice: Subject to any disclaimer, the term of this patent is extended or adjusted under 35 U.S.C. 154(b) by 359 days.

(21) Appl. No.: 12/187,890

(22) Filed: Aug. 7, 2008

(65) Prior Publication Data

US 2009/0040336 A1    Feb. 12, 2009

(30) Foreign Application Priority Data

Aug. 8, 2007    (JP) .............................. 2007-206166

(51) Int. Cl.
| H04N 9/64 | (2006.01) |
| H04N 5/217 | (2006.01) |
| H04N 9/73 | (2006.01) |
| G06K 9/00 | (2006.01) |
| G03F 3/08 | (2006.01) |

(52) U.S. Cl. ..................... 348/248; 348/241; 348/223.1; 348/243; 348/249; 382/162; 382/167; 358/518

(58) Field of Classification Search .............. 348/223.1, 348/248, 241, 251, 243, 587, 703, 249, 250, 348/311, 314; 382/162, 167; 358/518
See application file for complete search history.

(56) References Cited

U.S. PATENT DOCUMENTS

| 5,032,913 A * | 7/1991 | Hattori et al. ................. 348/70 |
| 7,358,993 B2 * | 4/2008 | Kawanishi et al. .......... 348/248 |
| 7,545,420 B2 * | 6/2009 | Kondo ......................... 348/248 |
| 7,586,527 B2 * | 9/2009 | Noguchi ...................... 348/248 |
| 2005/0052546 A1 * | 3/2005 | Nakabayashi et al. ..... 348/223.1 |

FOREIGN PATENT DOCUMENTS

| JP | 2002-84546 A | 3/2002 |
| JP | 2002-271802 A | 9/2002 |
| JP | 2004-15653 A | 1/2004 |

* cited by examiner

*Primary Examiner*—Lin Ye
*Assistant Examiner*—Marly Camargo
(74) *Attorney, Agent, or Firm*—Sughrue Mion, PLLC

(57) ABSTRACT

A digital still camera has a CCD image sensor, which includes an active pixel area for image pickup of an image to produce image data. A black pixel area is disposed outside the active pixel area, and produces black pixel data. The image pickup apparatus includes an amplifier for adjusting white balance of the image data. A smear detection unit detects a smeared portion of a smear phenomenon in the image according to the black pixel data. A tone correction unit reduces chroma of the image in a predetermined hue area according to a smear level of the smear phenomenon determined from the black pixel data, to carry out color correction of the smeared portion for the image data after adjusting the white balance.

7 Claims, 9 Drawing Sheets

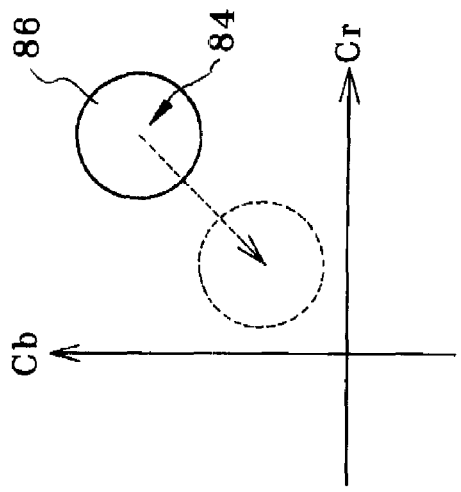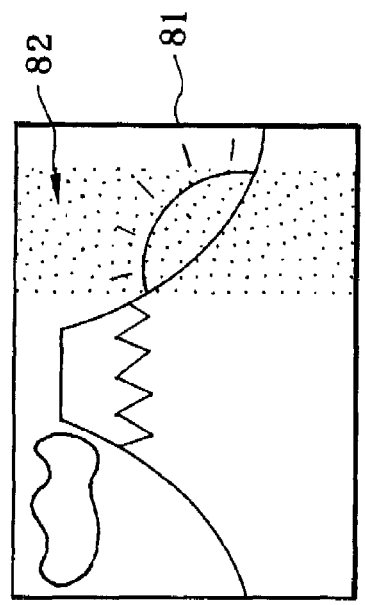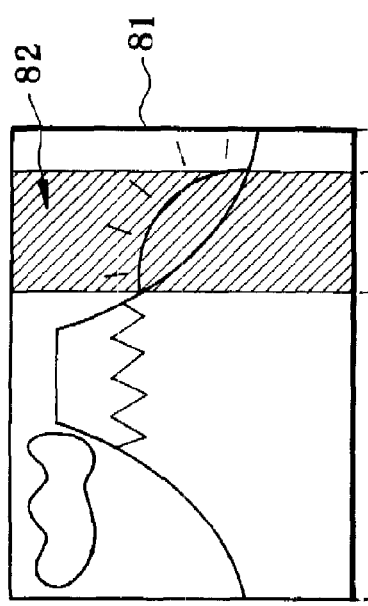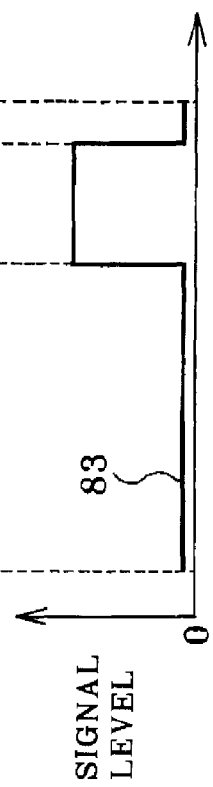

IMAGE PICKUP APPARATUS AND METHOD

BACKGROUND OF THE INVENTION

1. Field of the Invention

The present invention relates to an image pickup apparatus and method. More particularly, the present invention relates to an image pickup apparatus and method in which influence of a smear phenomenon can be suppressed by smear correction.

2. Description Related to the Prior Art

A digital still camera includes a CCD image sensor (charge coupled device) as image pickup device. In use of the digital still camera, a smear phenomenon is likely to occur. The smear phenomenon is a chroma clip of highlight in a vertically (or horizontally) extending line shape, and occurs specially when an extremely bright portion is included in an object in comparison with a peripheral region.

A smear phenomenon occurs when charge derived from light leaking in an originally shielded peripheral region (for example, vertical transfer path) other than photo diodes comes to pass in a transfer path of original charge of a signal from the photo diodes, or when charge generated in a semiconductor substrate comes to pass in the transfer path. Occurrence of the smear phenomenon is characteristically derived from the structure of the CCD image sensor.

It is known in the art that a smear amount of the smear phenomenon does not depend on an electronic shutter speed of the CCD image sensor but on the intensity of incident light owing to the feature of the smear phenomenon. It is possible to reduce the smear amount remarkably by eliminating unwanted charge passing into the transfer path after the use of a mechanical shutter to shield light to the CCD image sensor.

However, a smear amount increases when a motion image is picked up or a live image is picked up and monitored, as no mechanical shutter can operate. Also, a signal level derived from the smear phenomenon may become considerably high in the image pickup with a high electronic shutter speed.

Various techniques for reducing the smear amount are known. Modification of the CCD image sensor itself for suppressing the smear phenomenon requires very complicated structures. Also, a method of utilizing a signal from a black pixel area (optical black region) outside an active pixel area of the CCD image sensor is known for estimation of occurrence of the smear phenomenon. The smear amount is reduced by subtracting a component from an image signal, the component being derived from the smear phenomenon. However, there is a problem in that influence of the smear phenomenon remains even after the correction, because the subtraction is carried out also for pixels with saturation of charge free from the smear phenomenon, cause gray coloring of an originally white image portion.

A digital still camera of a widely available type has an adjuster for automatically adjusting white balance by estimating color temperature of a light source. The color temperature of the light source is retrieved by evaluating an image signal output by the CCD image sensor. When the smear phenomenon occurs, the color temperature of the light source cannot be obtained correctly. The adjustment of the white balance is likely to create an image without acceptable color balance.

There are known methods of signal processing for correcting the white balance by exact estimation of the color temperature of the light source even in occurrence of the smear phenomenon, for example, JP-A 2002-084546, JP-A 2002-271802 and U.S. Pat. No. 7,358,993 (corresponding to JP-A 2004-015653).

The adjustment of the white balance is based on addition or subtraction of an input gain (white balance gain) with signals of R, G and B color components, the input gain being determined according to the color temperature of the light source being estimated. In contrast, a component of the smear is superimposed to the R, G and B color components of the image signal in an offset manner or equally between the three colors.

There arises a problem in that the smear amount itself cannot be reduced in one image portion even though the white balance is suitably adjusted according to the color temperature of the light source. If the white balance is adjusted with occurrence of the smear phenomenon, coloring occurs on the smear phenomenon due to the calculation with the white balance gain for the smeared portion. The smeared portion is colored so unnaturally by the automatic correction of the white balance that image quality will be low.

SUMMARY OF THE INVENTION

In view of the foregoing problems, an object of the present invention is to provide an image pickup apparatus and method in which influence of a smear phenomenon can be suppressed by smear correction.

In order to achieve the above and other objects and advantages of this invention, an image pickup apparatus is provided, having an image pickup device including an active pixel area with pixels for image pickup of an image to produce image data, and a black pixel area, disposed outside the active pixel area, having black pixels shielded from light, for producing black pixel data. The image pickup apparatus includes an amplifier for adjusting white balance of the image data. A smear detection unit detects a smeared portion of a smear phenomenon in the image according to the black pixel data. A tone correction unit reduces chroma in a predetermined hue area according to a smear level of the smear phenomenon determined from the smear detection unit, by carrying out color correction of the smeared portion for the image data after adjusting the white balance.

The predetermined hue area has a size determined according to the smear level.

Furthermore, a memory stores information of a predetermined threshold for comparison with the smear level, wherein the tone correction unit, if the smear level is higher than the predetermined threshold, reduces the chroma within the predetermined hue area by processing the image data.

The tone correction unit, if the smear level is equal to or higher than the first threshold, compares the smear level with a great second threshold higher than the first threshold, and if the smear level is higher than the second threshold, reduces chroma within a small hue area smaller than the predetermined hue area by carrying out the color correction of the smeared portion for the image data.

The predetermined hue area is defined by a circle in a chrominance coordinate system, and the large hue area is defined by a large circle of which a center is near to a center of the circle of the predetermined hue area.

The tone correction unit determines the predetermined hue area according to a color tone of the smeared portion colored after adjusting the white balance according to a gain of adjusting the white balance.

Furthermore, a gain setting unit determines red, green and blue color gains to adjust the white balance according to the image data, and for assigning the amplifier with the gains. A memory stores information of a first gain threshold for comparison with the red color gain and a second gain threshold for comparison with the blue color gain. If the red color gain is higher than the first gain threshold and the blue color gain is higher than the second gain threshold, the predetermined hue area is defined to represent a magenta color. If the red color gain is higher than the first gain threshold and the blue color gain is equal to or lower than the second gain threshold, the predetermined hue area is defined to represent at least one of red, orange and yellow colors. If the red color gain is equal to or lower than the first gain threshold and the blue color gain is higher than the second gain threshold, the predetermined hue area is defined to represent at least one of blue, bluish cyan and cyan colors. If the red color gain is equal to or lower than the first gain threshold and the blue color gain is equal to or lower than the second gain threshold, the predetermined hue area is defined to represent a green color.

Also, an image pickup method of image pickup with an image pickup device is provided. The image pickup device includes an active pixel area for image pickup of an image to produce image data, and a black pixel area, disposed outside the active pixel area, for producing black pixel data. In the image pickup method, white balance of the image data is adjusted. A smeared portion of a smear phenomenon in the image is detected according to the black pixel data, to determine a smear level from the black pixel data. Chroma of the image in a predetermined hue area is reduced according to the smear level, to carry out color correction of the smeared portion for the image data after adjusting the white balance.

The predetermined hue area has a size determined according to the smear level.

Furthermore, the smear level is compared with a predetermined threshold. If the smear level is higher than the predetermined threshold, the chroma within the predetermined hue area is reduced by processing the image data.

Furthermore, if the smear level is equal to or lower than the predetermined threshold, the smear level is compared with a small threshold lower than the predetermined threshold. If the smear level is equal to or lower than the predetermined threshold and higher than the small threshold, chroma within a large hue area larger than the predetermined hue area is reduced by processing the image data.

In a preferred embodiment, a computer executable program for image pickup with an image pickup device is provided. The image pickup device includes an active pixel area for image pickup of an image to produce image data, and a black pixel area, disposed outside the active pixel area, for producing black pixel data. The computer executable program includes a program code for adjusting white balance of the image data. A program code is for detecting a smeared portion of a smear phenomenon in the image according to the black pixel data, to determine a smear level from the black pixel data. A program code is for reducing chroma of the image in a predetermined hue area according to the smear level, to carry out color correction of the smeared portion for the image data after adjusting the white balance.

Consequently, it is possible to suppress influence of a smear phenomenon, because a hue area is predetermined for color correction of the smear phenomenon for the image data.

BRIEF DESCRIPTION OF THE DRAWINGS

The above objects and advantages of the present invention will become more apparent from the following detailed description when read in connection with the accompanying drawings, in which:

FIG. 5A is a plan illustrating an image frame with a smear phenomenon;

FIG. 5B is a graph illustrating a signal level of a black pixel data;

FIG. 5C is a graph illustrating a hue area;

FIG. 5D is a plan illustrating the image frame in a state after color correction;

DETAILED DESCRIPTION OF THE PREFERRED EMBODIMENT(S) OF THE PRESENT INVENTION

Figure 1:
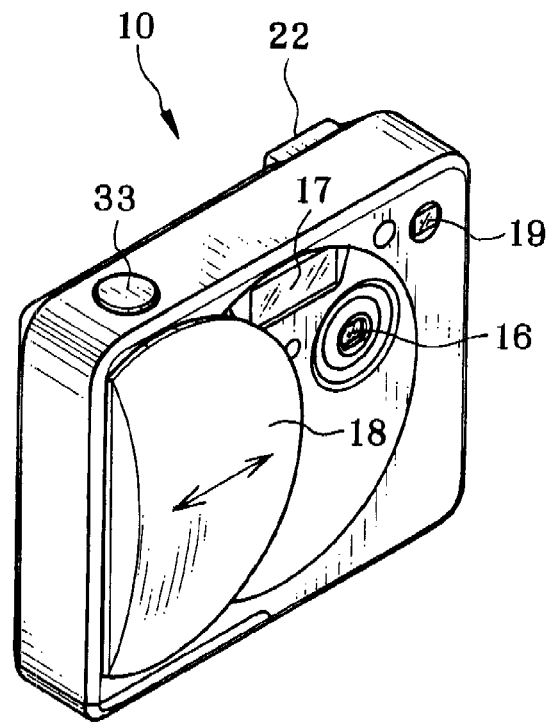
FIG. 1 is a perspective view illustrating a digital still camera.

In FIG. 1, a digital still camera 10 as image pickup apparatus is illustrated. Various elements appear on a front surface of the digital still camera 10, including a zoom lens system 16, a flash light source 17, a lens cover 18 or barrier, and a viewfinder objective window 19. The lens system 16 focuses light from an object on a CCD image sensor (not shown). When the digital still camera 10 is not used, the lens cover 18 is closed to cover the front of the lens system 16. The flash light source 17 is driven when brightness of an object is low, to illuminate the object for a higher exposure amount.

On the front of the digital still camera 10, the lens cover 18 is slidable horizontally between a closed position to cover the front of the lens system 16 and the flash light source 17 and an open position away from those. Also, a power switch is associated with the lens cover 18. When the lens cover 18 is in the closed position, the power source for the digital still camera 10 is turned off. When the lens cover 18 is in the open position, the power source for the digital still camera 10 is turned on.

An optical viewfinder is incorporated in the digital still camera 10. The viewfinder objective window 19 is a front window of the digital still camera 10, and appears in the front.

Figure 2:
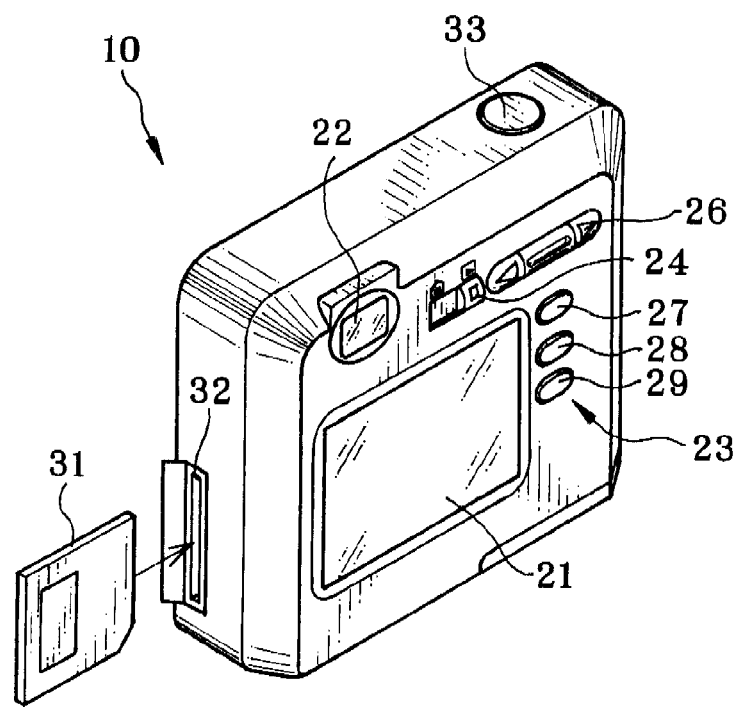
FIG. 2 is a rear perspective view illustrating a digital still camera.

In FIG. 2, the rear of the digital still camera 10 has an LCD display panel 21, a viewfinder eyepiece window 22, and an input interface 23. The LCD 21 displays an image, and various menus of the digital still camera 10. The LCD 21 operates as an electronic viewfinder by displaying a live image according to an output of the CCD image sensor. The viewfinder eyepiece window 22 appears in the rear of the digital still camera 10 as a rear surface of the optical viewfinder.

The input interface 23 includes a mode selector 24, a direction key 26, a menu button 27, a confirmation button 28 and a cancel button 29. The mode selector 24 is operable to change over modes of operation of the digital still camera 10. Examples of the modes include an image mode for image pickup, and a playback mode for reproducing an image on the LCD 21.

The menu button 27 is depressed to change the setting in the digital still camera 10. The LCD 21 is caused by the depression of the menu button 27 to display a menu for confirming and checking the setting of the digital still camera 10.

The direction key 26 is a general purpose key assigned with various functions different according to the status of the use of the digital still camera 10. While the playback mode is set in the digital still camera 10, the direction key 26 is a stepping key for changing an image to display on the LCD 21 one image after another. While the image mode is set in the digital still camera 10, the direction key 26 is a zoom key for changing a focal length of the lens system. When an administration mode is set in the digital still camera 10, the direction key 26 is a cursor key for shifting a cursor in the LCD 21 to select one of the plural menus.

A lateral surface of the digital still camera 10 has a card slot 32 and a group of terminals (not shown). The card slot 32 is loaded with a memory card 31 or other storage medium. The terminals are used for connection with an external device such as a computer.

A shutter release button 33 is positioned on the top and near to the right corner of the digital still camera 10. The shutter release button 33 is constituted by a two step switch. When the shutter release button 33 is depressed at first in a halfway position, the digital still camera 10 automatically adjusts the exposure amount of the digital still camera 10, focusing of the lens system 16 and other conditions. When the shutter release button 33 is depressed fully and more deeply than the halfway position, the digital still camera 10 takes an exposure for recording an image. The object image is created in the digital still camera 10 and written to the memory card 31 or other storage medium.

Figure 3A:
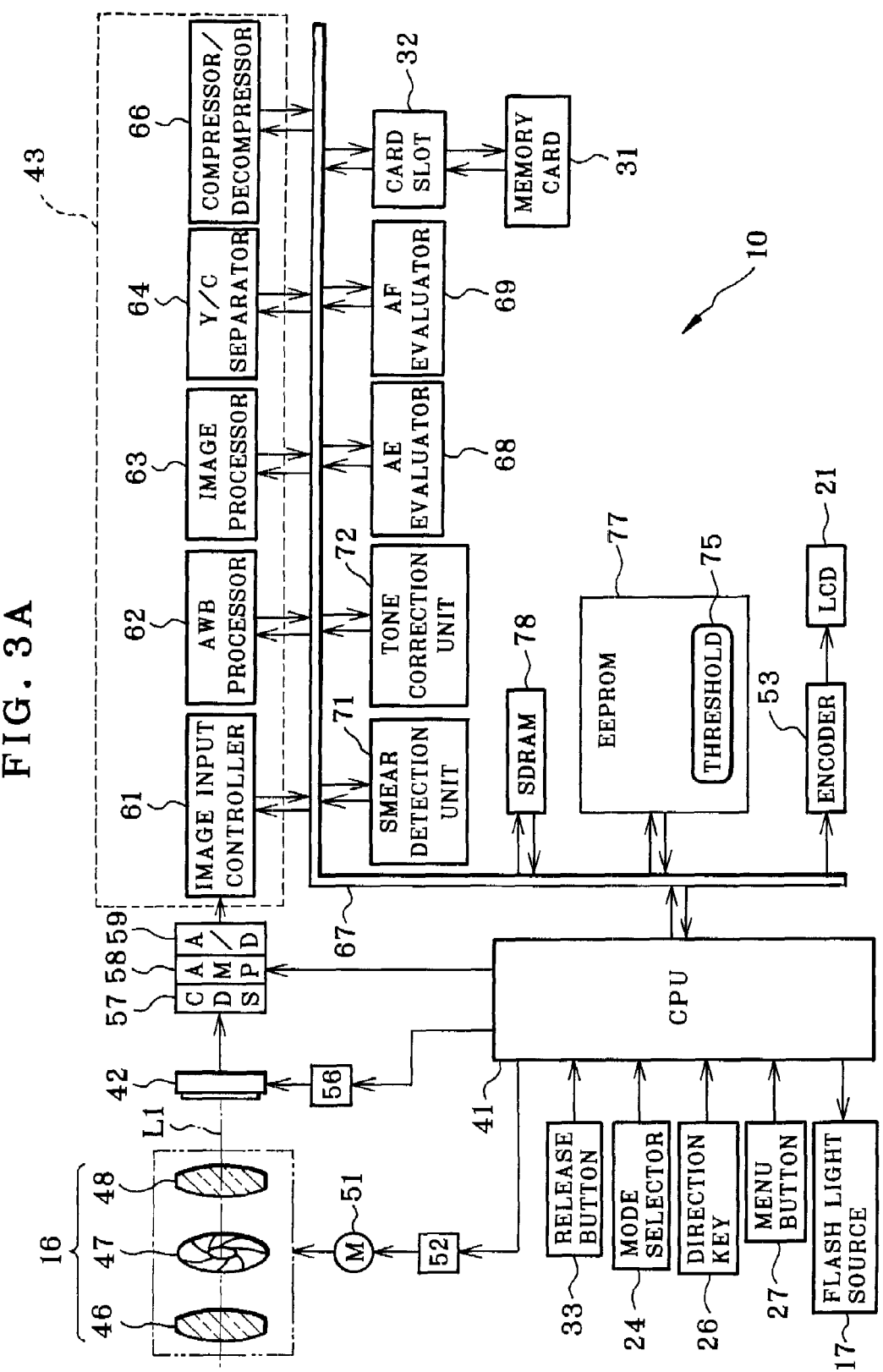
FIG. 3A is a block diagram illustrating circuit elements in the digital still camera.

In FIG. 3A, the digital still camera 10 includes a CPU 41, the lens system 16, a CCD image sensor 42 and a digital signal processor (DSP) 43. The CPU 41 controls various circuits in the digital still camera 10.

The lens system 16 includes a variator lens/lens group 46, an aperture stop mechanism 47, and a focus lens/lens group 48. The variator lens/lens group 46 is movable on the optical axis L1. When the direction key 26 is depressed in the image mode, the variator lens/lens group 46 is moved to change the focal length and magnification. The aperture stop mechanism 47 is driven when the shutter release button 33 is depressed halfway, and changes an aperture to adjust the exposure amount. The focus lens/lens group 48 is movable on the optical axis L1 back and forth in a manner similar to the variator lens/lens group 46. The focus lens/lens group 48 moves when the variator lens/lens group 46 moves or when the shutter release button 33 is depressed halfway, and adjusts the focus of the lens system 16.

Lens motors 51 are associated with the lens system 16 to drive the variator lens/lens group 46 and the focus lens/lens group 48 to move. Also, a motor moves the aperture stop mechanism 47 for adjusting its aperture area. The lens motors 51 are stepping motors. A moving mechanism in connection with the lens motors 51 includes gears. A motor driver 52 is connected with the CPU 41, and controls the lens motors 51.

The CCD image sensor 42 is disposed behind the lens system 16, photoelectrically converts object light focused on the reception surface by the lens system 16, and outputs an image signal of an analog form. Two types of image signals are output, a recording image signal and live image signal. The recording image signal is output when the shutter release button 33 is depressed fully, and has a high number of pixels. The live image signal is output with a lower number of pixels.

The recording image signal is converted into image data of a digital form, which is processed in the image processing, and written to the memory card 31 in a predetermined file format. A live image signal is output at a frame rate of 30 frames per second, and converted into live image data in a digital form, which is processed in the image processing in the same manner as the recording image signal. An SDRAM 78 has a VRAM region in which the live image data is buffered. An encoder 53 converts the live image data into a composite signal of an analog form, to display a live image in the LCD 21.

The CCD image sensor 42 has an electronic shutter structure. When a timing generator (TG) generates a shutter pulse, the CCD image sensor 42 deletes stored charge by elimination, so that time of storing charge is adjusted as charge to be output as recording image signal. An exposure amount in the image pickup of the digital still camera 10 depends upon the shutter speed of the CCD image sensor 42 as electronic shutter and the aperture value of the aperture stop mechanism 47. A CCD driver 56 is connected with the CPU 41, and controls the CCD image sensor 42.

An image signal of an analog form is output by the CCD image sensor 42. A correlated double sampling circuit (CDS) 57 is supplied with the image signal, and eliminates a component of electric noise from the image signal. Then an amplifier 58 amplifies the image signal. An A/D converter 59 converts the image signal into image data of a digital form. The image data has R, G and B components expressing amounts of charge stored in respective cells arranged on the reception surface of the CCD image sensor 42. The digital signal processor 43 is supplied with the image data.

The digital signal processor 43 includes an image input controller 61, an AWB processor 62 as gain setting unit, an image processor 63, a Y/C separator 64 and a compressor/decompressor 66. The image input controller 61 buffers image data input by the A/D converter 59. A data bus 67 is connected with various circuits in the digital still camera 10. The buffered image data is transmitted through the data bus 67 and stored in the SDRAM 78 temporarily.

The AWB processor 62 reads image data from the SDRAM 78, and evaluates and checks the white balance. The AWB processor 62, if the white balance of the image data is found not suitable, evaluates input gains for R, G and B components, to adjust the white balance of the image data by amplification with the input gains.

The image processor 63 reads image data from the SDRAM 78, and processes the image data in halftone processing, gamma processing and other image processing. The image data processed by the image processor 63 is stored in the SDRAM 78.

The Y/C separator 64 reads image data from the SDRAM 78 after image processing in the image processor 63, and converts the image data into the luminance signal Y and chrominance signals Cr and Cb.

The compressor/decompressor 66 receives image data after the Y/C separation, and outputs the image data in the JPEG format, TIFF format or other suitable formats. A medium controller (not shown) writes the compressed image data from the compressor/decompressor 66 to the memory card 31.

The digital still camera 10 includes an auto exposure evaluator (AE) 68 and an autofocus evaluator (AF) 69. The auto exposure evaluator 68 reads image data from the SDRAM 78, detects brightness of an object according to a predetermined region of auto exposure evaluation, to check an exposure amount. According to the object brightness determined by the auto exposure evaluator 68, the CPU 41 calculates an electronic shutter speed of the CCD image sensor 42 and a size of an aperture of the aperture stop mechanism 47, to optimize the exposure amount for image pickup.

The autofocus evaluator 69 reads image data from the SDRAM 78, extracts a high frequency component in a predetermined region of autofocus evaluation, and obtains an autofocus evaluation value by multiplication of the high frequency component. While the focus lens/lens group 48 is moved, the CPU 41 obtains an in-focus position of the highest contrast in the region of the autofocus evaluation to maximize the autofocus evaluation value. The CPU 41 sets the focus lens/lens group 48 to the in-focus position, to adjust the focus of the lens system 16.

Figure 3B:
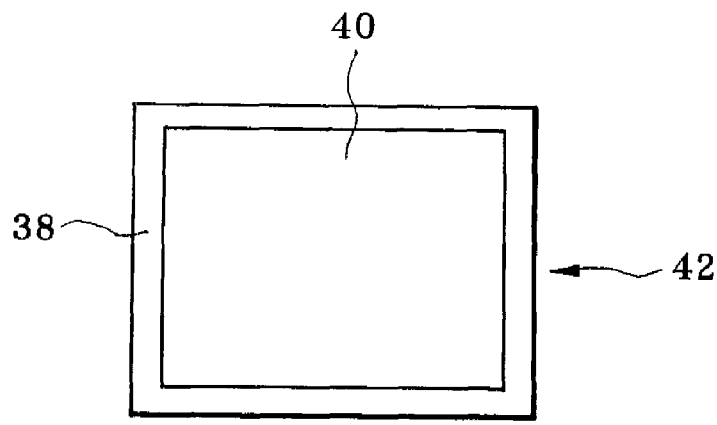
FIG. 3B is an explanatory view illustrating an active pixel area and a black pixel area.

The digital still camera 10 includes a smear detection unit 71 and a tone correction unit 72 for specific color tone. In FIG. 3B, a reception surface of the CCD image sensor 42 has an active pixel area 40 and a black pixel area 38 outside the active pixel area 40. When the smear detection unit 71 is supplied with the image data by the A/D converter 59, the smear detection unit 71 retrieves black pixel data (OB data) derived from the black pixel area 38. The black pixel data is reference data owing to pixels without entry of light, and has a flat level if no smear phenomenon occurs in the image data. The smear detection unit 71 evaluates the black pixel data and checks whether a smear phenomenon occurs according to changes in the level of the black pixel data. When the smear phenomenon is found, then the smear detection unit 71 determines a smear level as feature value. Examples of the smear levels are a signal level of the data of a smeared portion in the black pixel data, and a position, width and area of the smeared portion. In the present embodiment, the smear level determined by the smear detection unit 71 is a signal level of the data of smeared portion.

The tone correction unit 72 processes image data with a smear phenomenon to reduce the chroma in a predetermined hue area. A threshold 75 is preset in the tone correction unit 72, which compares a smear level from the smear detection unit 71 with the threshold 75, the smear level being a signal level associated with the detected smear phenomenon.

If the smear level being detected is higher than the threshold 75, a smear phenomenon is found to influence image quality of image data seriously. Then image processing of the image data is carried out to reduce chroma only in relation to the predetermined hue area. A reduction amount of reducing the chroma is also determined according to the detected smear level. The image data for the image processing to reduce the chroma in the tone correction unit 72 is data after the Y/C separation.

If the detected smear level is found equal to or lower than the threshold 75, there is no reducing of chroma, because the smear phenomenon is found not to influence quality of image data. Then the image data is processed only in the image processing in the digital signal processor 43.

An EEPROM 77 is a memory storing a control program for the digital still camera 10, profile information and other information. The profile information includes the threshold 75 for comparison with the smear level, hue areas for reducing the chroma, and the like.

The SDRAM 78 is a working memory, stores image data temporarily, and is loaded with a control program in the digital still camera 10 to run in the CPU 41. A VRAM region is defined in the SDRAM 78 for storing live image data. In the VRAM region, the live image data to buffer is renewed at a frame rate of the CCD image sensor 42 to output a live image signal. Also, the SDRAM 78 stores metadata of characteristics of the smear phenomenon detected by the smear detection unit 71.

Figure 4:
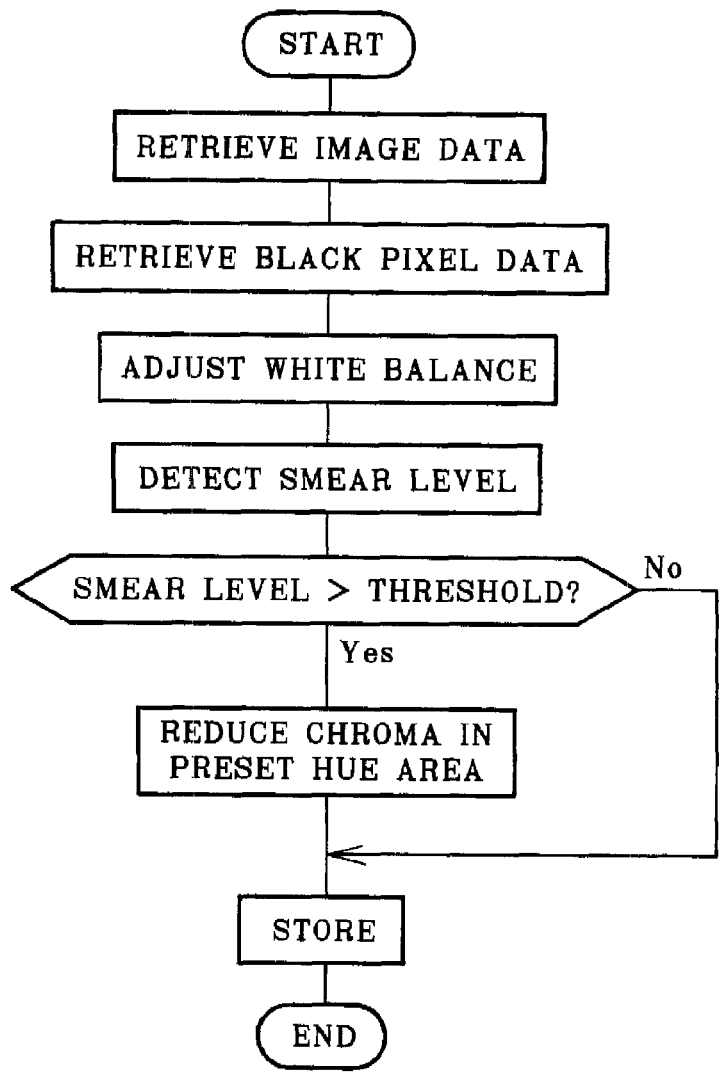
FIG. 4 is a flow chart illustrating a sequence of image pickup.

The operation of the digital still camera 10 is described now. In FIG. 4, the shutter release button 33 is depressed at first. The digital still camera 10 creates image data, and also produces black pixel data. This is the image pickup step.

In the white balance adjusting step, the image data is adjusted automatically for the white balance. The R, G and B color gains are used in the calculation for the R, G and B components of the image signal to optimize the white balance. The white balance is adjusted for all of the pixels in the entire frame of the image.

All the pixels including those with saturation of stored charge due to the smear phenomenon are adjusted for the white balance. It is likely that automated adjustment of the white balance causes unnatural coloring of the smeared portion in occurrence of a smear phenomenon in the image data. The image data is processed in the gamma correction and other image processing, and separated in Y/C separation.

At the same time as the image processing, information of a smear phenomenon, for example a smear level is detected according to the black pixel data. This is a smear detecting step. Then the smear level is compared with the threshold 75 as preset value.

If the detected smear level is found equal to or lower than the threshold 75, image data processed in the image processing is compressed in the JPEG format, and is written to the memory card 31.

If the smear level is found higher than the threshold 75, the image data is further processed in image processing of reducing chroma of a color tone in a predetermined hue area. This is a tone correcting step. The hue area is so preset that chroma in relation to magenta tone is reduced to obtain a state close to a gray color. The reduction amount of reducing the chroma is determined according to the smear level.

Image data after reducing chroma in the predetermined hue area is compressed in the JPEG format or the like in the manner similar to the above, and stored in the memory card 31.

In FIG. 5A, an object in a scene with a sun is photographed. An image frame 81 is created but with a smeared portion 82. To adjust the white balance of the image frame 81, a red color gain and blue color gain are approximately 1.5 times as high as a green color gain. Although the smeared portion 82 has an originally white color, there occurs coloring of the smeared portion 82 in a magenta tone due to the white balance adjustment.

In FIG. 5B, the smear phenomenon occurs in the image frame 81. Black pixel data 83 or optical black signal is obtained by image pickup of the image frame 81. A pattern of a high level occurs in the curve of the black pixel data 83 in the position of the smeared portion 82. The black pixel data 83 is data obtained from an optical black area (OB area) in the CCD image sensor 42 shielded from light, and is used as reference of an optically defined black color. Its signal level is generally low so that electric noise in the dark current is expressed. An abrupt change in the level of the black pixel data 83 is an expression of a smear phenomenon as signal level additional as offset to an original image signal. The digital still camera 10 detects a smear level by determining an abrupt change in the signal level of the black pixel data 83.

In FIG. 5C, a magenta color 84 of the smeared portion 82 after coloring in the white balance adjustment is two-dimensionally expressed in an area included in the quadrant I in the Cr-Cb coordinate system. A predetermined hue area 86 as color tone area containing a region of the magenta color 84 is preset in the digital still camera 10, which processes the image frame 81 in the image processing to reduce the chroma in relation to the hue area 86. Namely, an image is converted to shift the information of the color in the hue area 86 toward the origin of the Cr-Cb coordinate system. The reduction amount of reducing the chroma in the hue area 86 is predetermined.

The chroma in the hue area 86 expressing a color including the color of the smeared portion 82 after the white balance adjustment is reduced. In FIG. 5D, the magenta color 84 at the smeared portion 82 comes to have a thin gray color. Portions of the image frame 81 other than the smeared portion 82 are free from influence of changing the color.

Consequently, it is possible in the digital still camera 10 to suppress degradation of images due to a smear phenomenon, because appearance of the smeared portion 82 can be made inconspicuous by reducing the chroma of its color tone in the white balance adjustment.

In the embodiment, the preset hue area includes a region of the color tone of the smeared portion after the white balance adjustment. However, it is possible to determine the hue area to reduce the chroma according to the smear level being detected.

Figure 6:
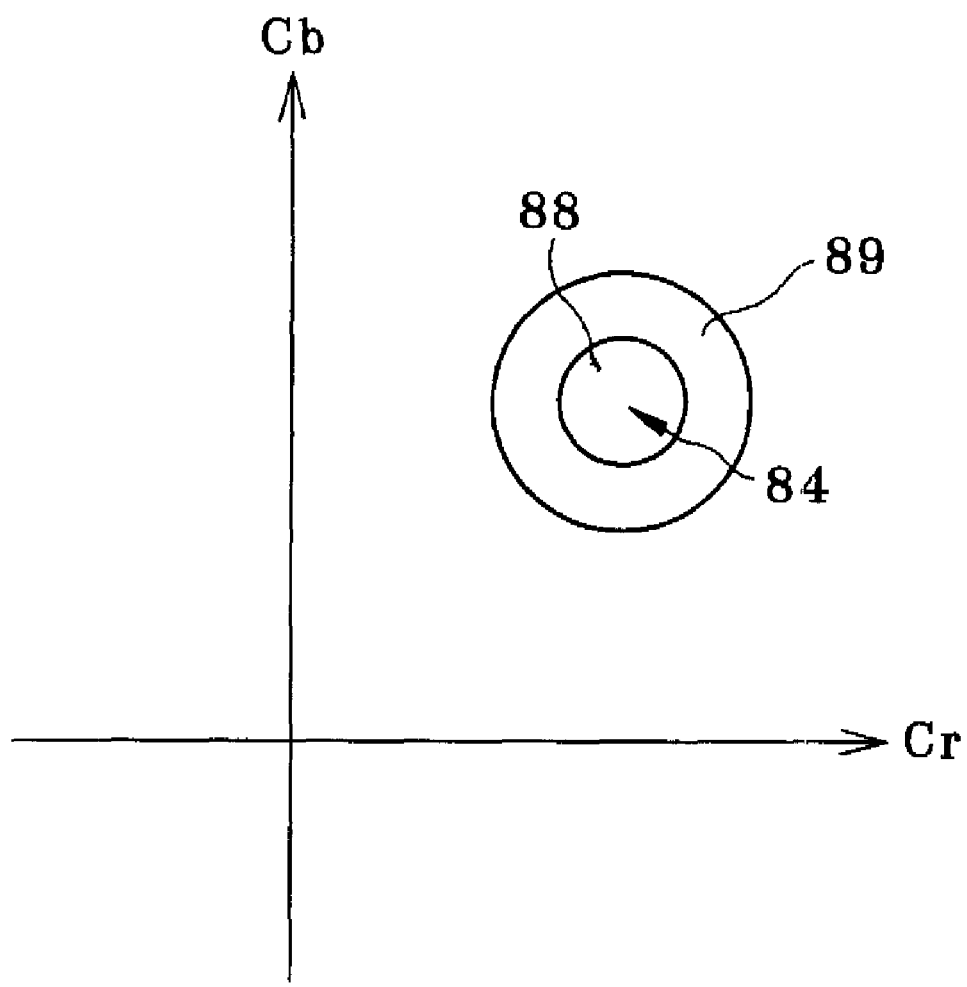
FIG. 6 is a graph illustrating another preferred embodiment with large and small hue areas.
Figure 7:
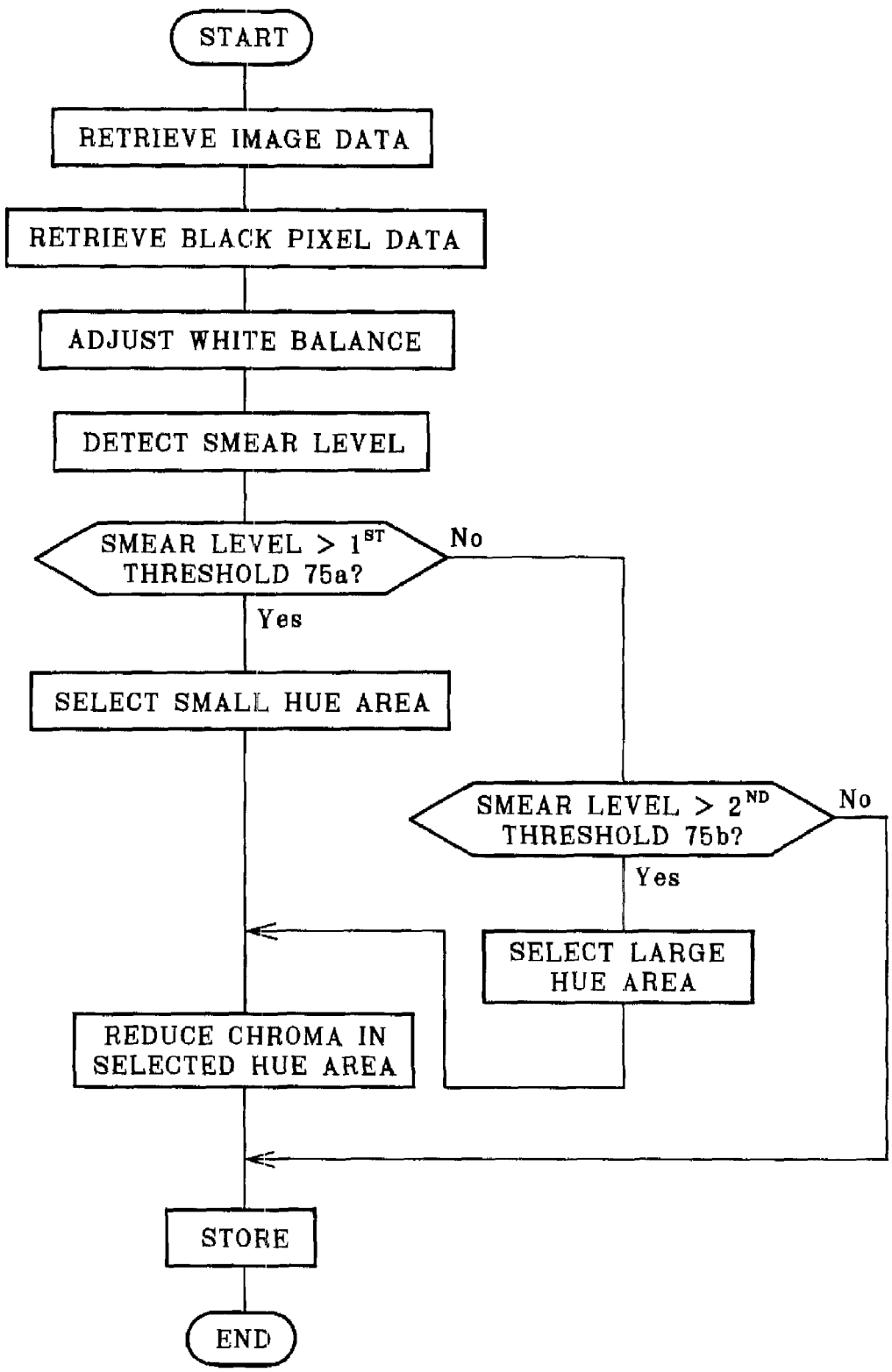
FIG. 7 is a flow chart illustrating a sequence of changing a size of the hue area according to the smear level.

A first threshold 75a and a second threshold 75b are predetermined for comparison with a smear level. See FIG. 7. Also, a small hue area 88 and large hue area 89 as color tone areas are predetermined in the graph of FIG. 6 as preset hue areas. If the smear level is found higher than the first threshold 75a, then the small hue area 88 is designated. The chroma expressed by the small hue area 88 is reduced in relation to the image data.

If the detected smear level is found equal to or lower than the first threshold 75a and higher than the second threshold 75b, then the large hue area 89 is designated. The chroma of the color tone in the large hue area 89 is reduced. Also, if the detected smear level is found equal to or lower than the second threshold 75b, there is no reducing the chroma of a particular color tone. Image data is compressed and stored.

A portion of the image data with a smear phenomenon is constituted by a component originally derived from the image pickup and a component derived from the smear phenomenon. According to the occurrence of a smear phenomenon in general, a component of the smear phenomenon is superimposed to the R, G and B color components of the image signal as offset or equally between the three colors. Thus, the color tone of the smeared portion differs in the hue area according to the proportion of the color components of image data derived originally from the image pickup.

If the smear level is relatively high, namely if the level of the signal derived from the smear phenomenon is high relative to the initial image signal, the color of the smeared portion depends on the level of the signal derived from the smear phenomenon common between the R, G and B colors. Only small unevenness occurs in the hue area. This is the same for the color tone of a smeared portion after coloring with correction of the white balance. Therefore, a small area as a hue area for reducing the chroma can be selected if the smear level is higher than the first threshold 75a. Thus, the small hue area 88 is designated.

If the smear level is comparatively low, the color tone of the smeared portion is according to an original image signal because the signal level derived from the smear phenomenon is not very high in comparison with the original image signal. This is the same for the color tone of the smeared portion of coloring after the white balance adjustment. When the smear level is found equal to or lower than the first threshold 75a and higher than the second threshold 75b, then the large hue area 89 is designated. This is because the hue area for reducing the chroma should be larger than that for the situation where the smear level is comparatively high.

Thus, the hue area for reducing the chroma is selectively determined according to a detected smear level. Portions of image frames other than a smeared portion can be free from influence. The coloring of the smeared portion can be reduced reliably.

In the above embodiment, the hue areas are previously determined for selective designation. Furthermore, it is preferable to change the hue area suitably in consideration of the smear level. For example, a center of a circular shape of the hue area may be predetermined. A diameter of the hue area can be calculated from the smear level, to set the hue area for reducing the chroma.

The above embodiment has been described with the example of coloring a smeared portion in the magenta color according to the white balance adjustment. Furthermore, it is preferable to reduce the chroma in relation to a smeared portion colored in any colors other than the magenta color, so as to make inconspicuous the coloring of the smeared portion.

Figure 8:
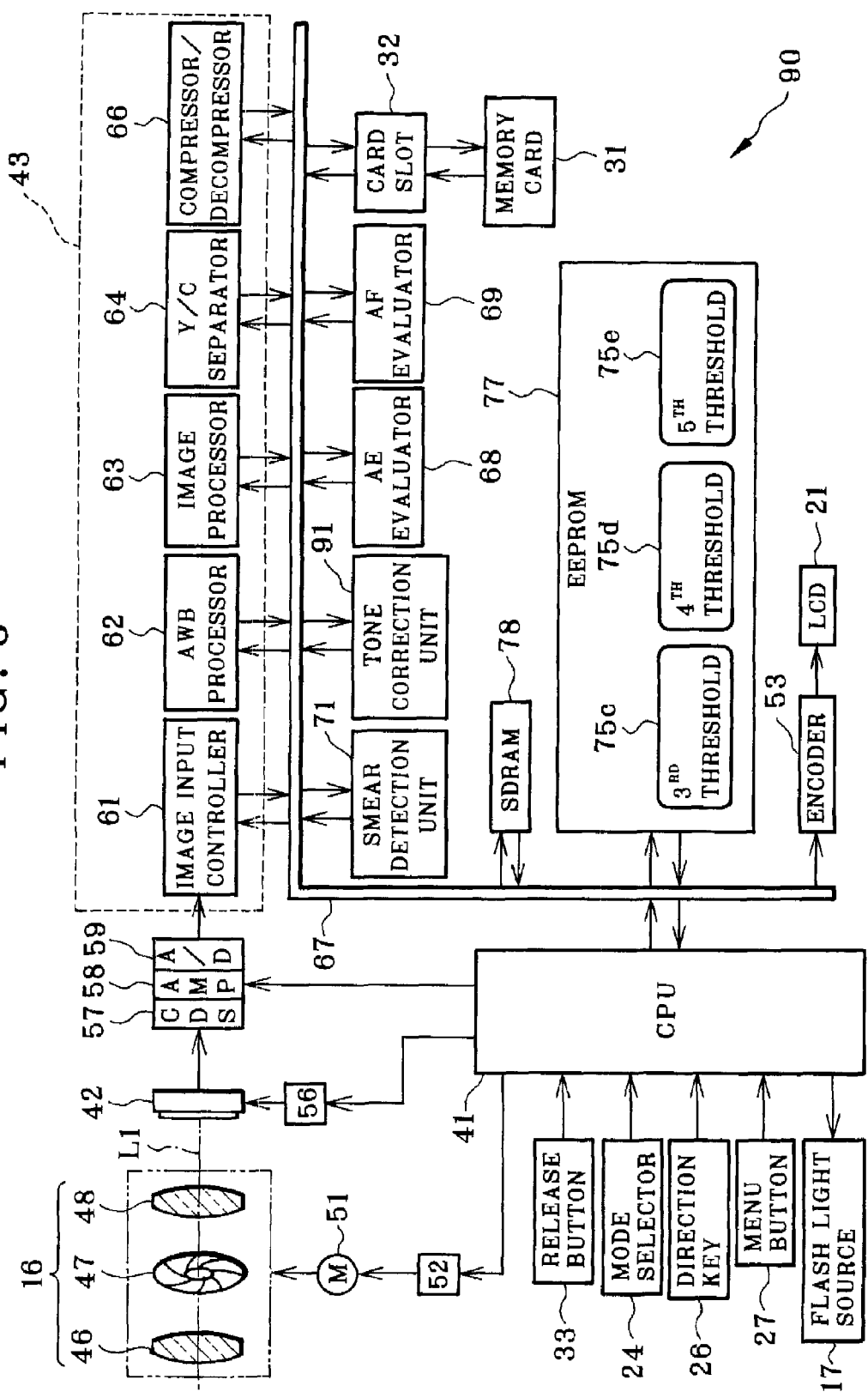
FIG. 8 is a block diagram illustrating another preferred digital still camera with a changeable hue area.

In FIG. 8, a digital still camera 90 includes a tone correction unit 91 for a specific color tone in place of the tone correction unit 72 described above. Various data are preset in the digital still camera 90, including a third threshold 75c, a fourth threshold 75d, a fifth threshold 75e, and a first hue area 92a, a second hue area 92b, a third hue area 92c, and a fourth hue area 92d as color tone areas.

The tone correction unit 91 retrieves R, G and B color gains from the AWB processor 62 as white balance gains. According to those, the tone correction unit 91 determines a red/green ratio of the red color gain to the green color gain and a blue/green ratio of the blue color gain to the green color gain. The tone correction unit 91 compares each of the red/green and blue/green ratios with the third, fourth and fifth thresholds 75c, 75d and 75e, and designates a selected one of the hue areas according to the color of the smeared portion after the white balance adjustment. Image processing is carried out for the image data to reduce the chroma of the color tone expressed by the designated hue area.

The EEPROM 77 stores the third, fourth and fifth thresholds 75c-75e. The red/green and blue/green ratios of the red and blue color gains to the green color gain are compared with each one of the thresholds.

Figure 9:
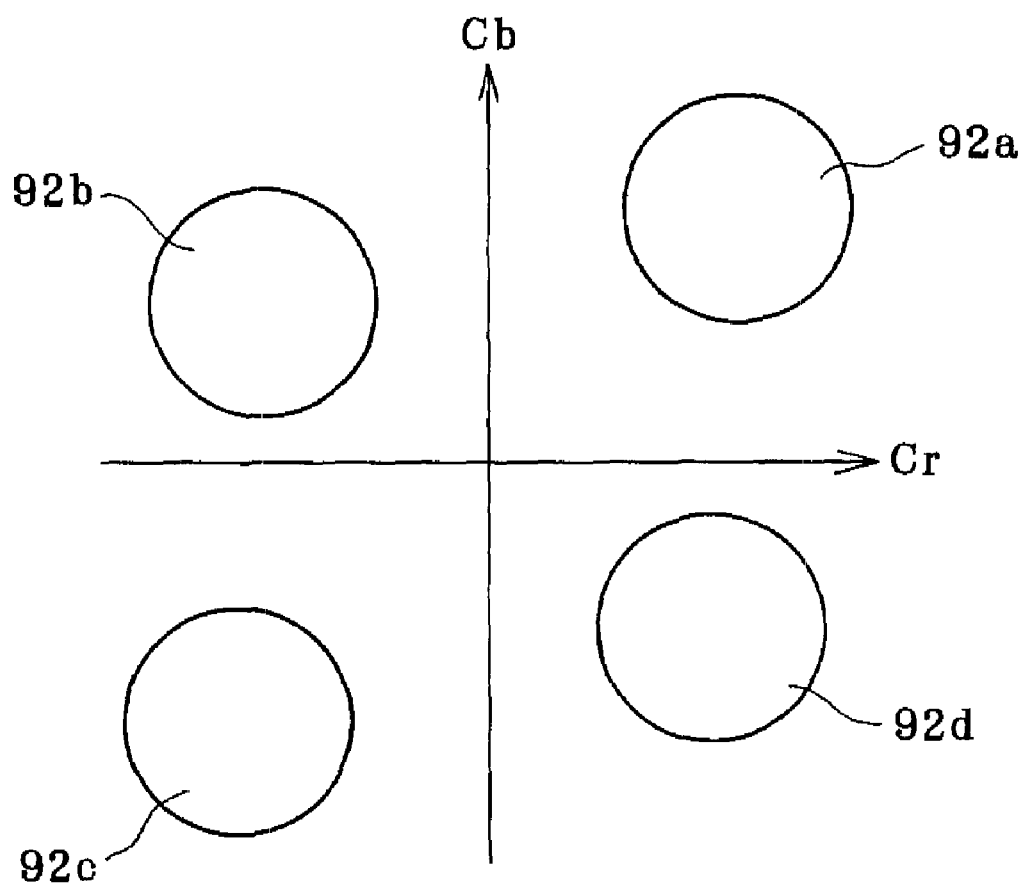
FIG. 9 is a graph illustrating four hue areas.

In FIG. 9, information of the hue areas 92a-92d is predetermined and stored in the EEPROM 77. The first hue area 92a is included in the quadrant I in the Cr-Cb coordinate system, and mainly represents a magenta color. The second hue area 92b is included in the quadrant II in the Cr-Cb coordinate system, and mainly represents blue, bluish cyan and cyan colors. The third hue area 92c is included in the quadrant III in the Cr-Cb coordinate system, and mainly represents a green color. The fourth hue area 92d is included in the quadrant IV in the Cr-Cb coordinate system, and mainly represents red, orange and yellow colors.

Figure 10:
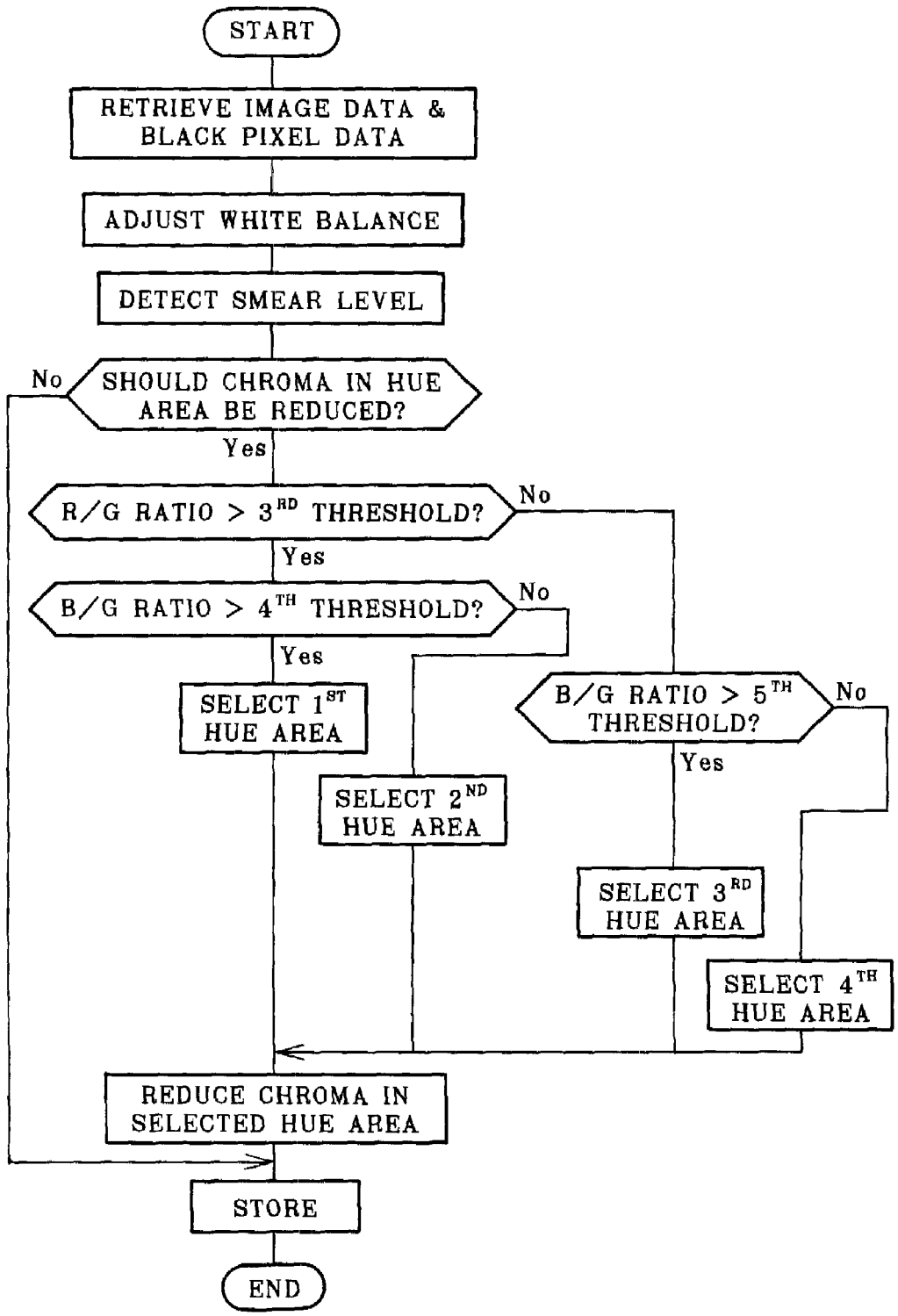
FIG. 10 is a flow chart illustrating a sequence of changing over the hue areas.

In FIG. 10, the smear level is compared with the first and second thresholds 75a and 75b in the digital still camera 90, to check whether the chroma should be reduced for the color tone in the predetermined hue area by the image processing.

When the image processing to reduce the chroma in a selected hue area is determined, the red/green ratio of the red color gain to the green color gain is compared with the third threshold 75c. If the red/green ratio is found higher than the third threshold 75c, then the blue/green ratio of the blue color gain to the green color gain is compared with the fourth threshold 75d.

If the red/green ratio of the red color gain is higher than the third threshold 75c and the blue/green ratio of the blue color gain is equal to or lower than the fourth threshold 75d, then the first hue area 92a is selected. Image processing of image data is carried out to reduce the chroma of the color tone associated with the first hue area 92a. Specifically, when an entire image of the image data before the white balance adjustment is somewhat greenish, the white balance is adjusted with a higher red/green ratio of the red color gain to the green color gain and a higher blue/green ratio of the blue color gain to the green color gain. Thus, coloring of the smear portion in the magenta color is expected to occur after the white balance adjustment. In view of this, the first hue area 92a for the magenta color is selectively designated to reduce the chroma in relation to its color tone.

If the red/green ratio of the red color gain is higher than the third threshold 75c and the blue/green ratio of the blue color gain is equal to or lower than the fourth threshold 75d, then the fourth hue area 92d is selected. Image processing of image data is carried out to reduce the chroma of the color tone associated with the fourth hue area 92d. Specifically, when an entire image of the image data before the white balance adjustment is somewhat bluish, the white balance is adjusted with a higher red/green ratio of the red color gain to the green color gain and a lower blue/green ratio of the blue color gain to the green color gain. Thus, coloring of the smear portion in the red, orange or yellow color is expected to occur after the white balance adjustment. In view of this, the fourth hue area 92d for the red, orange and yellow colors is selectively designated to reduce the chroma in relation to its color tone.

If the red/green ratio is equal to or lower than the third threshold 75c, the blue/green ratio is compared with the fifth threshold 75e. When the red/green ratio is equal to or lower than the third threshold 75c and the blue/green ratio is higher than the fifth threshold 75e, then the second hue area 92b is selected for image processing of the image data to reduce the chroma in the color tone of the second hue area 92b. Specifically, when an entire image of the image data before the white balance adjustment is somewhat yellowish, the white balance is adjusted with a lower red/green ratio of the red color gain to the green color gain and a higher blue/green ratio of the blue color gain to the green color gain. Thus, coloring of the smear portion in the blue, bluish cyan or cyan color is expected to occur after the white balance adjustment. In view of this, the second hue area 92b for the blue, bluish cyan and cyan colors is selectively designated to reduce the chroma in relation to its color tone.

If the red/green ratio is equal to or lower than the third threshold 75c and the blue/green ratio is equal to or lower than the fifth threshold 75e, then the third hue area 92c is selected for image processing of the image data to reduce the chroma in the color tone of the third hue area 92c. Specifically, if an image of the image data before the white balance adjustment has a magenta tone in the entire frame, the white balance is adjusted with smaller values of a red color gain and blue color gain in comparison with a green color gain. Thus, greenish coloring of the smeared portion is expected to occur after the white balance adjustment. In operation of the embodiment, chroma of the color tone of the image is reduced according to the third hue area 92c associated with the green color.

Consequently, color correction for a smear phenomenon after the white balance adjustment can be carried out by changing the hue area for reducing the chroma according to gains in the white balancing.

In the above embodiment, a suitable one of the first to fourth hue areas in the Cr-Cb coordinate system is selected to change the hue area to reduce the chroma according to the white balance gain. However, other methods may be used to change a hue area for reducing the chroma. It is preferable to determine a small hue area for reducing the chroma according to highness of the detected smear level.

In the embodiment, the four hue areas in the Cr-Cb coordinate system are predetermined. Furthermore, it is possible to determine a hue area according to ratios between R, G and B color gains. For example, ratios between R, G and B color gains are used to calculate a hue area or hue information of color tone of a smeared portion after the white balance adjustment. The hue area with the color tone of the smeared portion can be used for reducing the chroma.

In the embodiment, the third, fourth and fifth thresholds 75c-75e are predetermined for comparison to designate a hue area. However, the number and the values of the thresholds may be modified. For example, the fifth threshold 75e can be equal to the fourth threshold 75d.

In the above embodiments, the signal level in the black pixel data for a smear phenomenon is used as a smear level. However, other data or signal may used as a smear level or smear amount. For example, area data as a product of multiplication of the signal level and the width of the smear can be used as a smear level. The use of the determined area data as smear level is effective in suitably obtaining a region of hue for reducing the chroma, a reduction amount of reducing the chroma and the like, typically when unevenness of the signal level occurs in the width of a region of the smear phenomenon.

In the above embodiment, the A/D converter 59 inputs image data to the smear detection unit 71. However, the smear detection unit 71 can be supplied with image data by other circuit elements and upon suitable timing. For example, an image signal from the CCD image sensor 42 may be input to the smear detection unit 71.

In the above embodiment, the hue areas are circular. However, predetermined hue areas in the Cr-Cb coordinate system may be elliptical, quadrilateral or the like in any suitable manner. In the above embodiments, the plural hue areas are in the same shape or similar shape. However, hue areas can be formed in shapes different from one another. Furthermore, hue areas can be defined in the RGB coordinate system or the like other than the Cr-Cb coordinate system.

In the above embodiment, the entirety of the image data is used in the image processing for reducing the chroma in relation to the hue area of interest. However, other methods can be used. For example, a portion of a smear phenomenon can be processed in the image processing in place of using the entirety of the image data for reducing the chroma, because the position and width of the smeared portion can be easily detected according to the black pixel data 83.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image pickup apparatus, having an image pickup device including an active pixel area with pixels for image pickup of an image to produce image data, and a black pixel area, disposed outside said active pixel area, having black pixels shielded from light, for producing black pixel data, said image pickup apparatus comprising:

an amplifier for adjusting white balance of said image data;

a smear detection unit for detecting a smeared portion of a smear phenomenon in said image according to said black pixel data;

a tone correction unit for reducing chroma in a predetermined hue area according to a smear level of said smear phenomenon determined from said smear detection unit, by carrying out color correction of said smeared portion for said image data after adjusting said white balance,
wherein said predetermined hue area has a size determined according to said smear level, and further comprising:
a memory for storing information of a first threshold for comparison with said smear level, wherein said tone correction unit, if said smear level is higher than said first threshold, carries out said color correction.

2. An image pickup apparatus as defined in claim 1, wherein said tone correction unit, if said smear level is equal to or higher than said first threshold, compares said smear level with a great second threshold higher than said first threshold, and if said smear level is higher than said second threshold, reduces chroma within a large hue area larger than said predetermined hue area by carrying out said color correction of said smeared portion for said image data.

3. An image pickup apparatus as defined in claim 2, wherein said predetermined hue area is defined by a circle in a chrominance coordinate system, and said large hue area is defined by a large circle of which a center is near to a center of said circle of said predetermined hue area.

4. An image pickup apparatus as defined in claim 1, wherein a gain of said amplifier is adjustable according to a correction amount of said white balance, and said tone correction unit determines said predetermined hue area according to said gain of adjusting said white balance.

5. An image pickup apparatus as defined in claim 1, further comprising:
a gain setting unit for determining red, green and blue color gains to adjust said white balance according to said image data, and for assigning said amplifier with said gains;
a memory for storing information of a first gain threshold for comparison with said red color gain and a second gain threshold for comparison with said blue color gain;
wherein if said red color gain is higher than said first gain threshold and said blue color gain is higher than said second gain threshold, said predetermined hue area is defined to represent a magenta color;
if said red color gain is higher than said first gain threshold and said blue color gain is equal to or lower than said second gain threshold, said predetermined hue area is defined to represent at least one of red, orange and yellow colors;
if said red color gain is equal to or lower than said first gain threshold and said blue color gain is higher than said second gain threshold, said predetermined hue area is defined to represent at least one of blue, bluish cyan and cyan colors;
if said red color gain is equal to or lower than said first gain threshold and said blue color gain is equal to or lower than said second gain threshold, said predetermined hue area is defined to represent a green color.

6. An image pickup method of image pickup with an image pickup device including an active pixel area with pixels for image pickup of an image to produce image data, and a black pixel area, disposed outside said active pixel area, having black pixels shielded from light, for producing black pixel data, said image pickup method comprising steps of:
adjusting white balance of said image data;
detecting a smeared portion of a smear phenomenon in said image according to said black pixel data, to determine a smear level from said black pixel data;
reducing chroma of said image in a predetermined hue area according to said smear level, by carrying out color correction of said smeared portion for said image data after adjusting said white balance,
wherein said predetermined hue area has a size determined according to said smear level, and
storing information in a memory of a first threshold for comparison with said smear level, wherein color correction is carried out if said smear level is higher than said first threshold.

7. An image pickup method as defined in claim 6, wherein said predetermined hue area is determined according to a gain of amplification of adjusting said white balance.

* * * * *